(12) United States Patent
Fröhlich et al.

(10) Patent No.: US 10,901,088 B2
(45) Date of Patent: Jan. 26, 2021

(54) LASER SCANNER WITH LIGHT

(71) Applicant: ZOLLER & FRÖHLICH GMBH, Wangen im Allgäu (DE)

(72) Inventors: Christoph Fröhlich, Wangen (DE); Markus Mettenleiter, Isny (DE)

(73) Assignee: ZOLLER & FRÖHLICH GMBH, Wangen im Allgäu (DE)

( * ) Notice: Subject to any disclaimer, the term of this patent is extended or adjusted under 35 U.S.C. 154(b) by 0 days.

(21) Appl. No.: 16/332,753

(22) PCT Filed: Sep. 6, 2017

(86) PCT No.: PCT/EP2017/072347
§ 371 (c)(1),
(2) Date: Mar. 12, 2019

(87) PCT Pub. No.: WO2018/050512
PCT Pub. Date: Mar. 22, 2018

(65) Prior Publication Data
US 2020/0174125 A1 Jun. 4, 2020

(30) Foreign Application Priority Data

Sep. 15, 2016 (DE) .......... 10 2016 117 431
Oct. 7, 2016 (DE) .......... 10 2016 119 155
Jun. 30, 2017 (DE) .......... 10 2017 114 617

(51) Int. Cl.
*G01S 17/42* (2006.01)
*G01S 17/86* (2020.01)
(Continued)

(52) U.S. Cl.
CPC ............ *G01S 17/42* (2013.01); *G01S 7/4813* (2013.01); *G01S 7/4817* (2013.01); *G01S 17/86* (2020.01);
(Continued)

(58) Field of Classification Search
CPC ........ G01S 17/42; G01S 17/86; G01S 7/4813; G01S 17/89; H04N 5/2256; G03B 17/48; G03B 37/02; G03B 15/03
See application file for complete search history.

(56) References Cited

U.S. PATENT DOCUMENTS

2003/0058738 A1*  3/2003  Erikson ................... G01S 17/86
                                                            367/7
2006/0126060 A1*  6/2006  Colle ................. G01N 21/9054
                                                            356/239.4
(Continued)

FOREIGN PATENT DOCUMENTS

DE     198 51 307 A1    4/2000
DE     101 50 436 B4    5/2008
(Continued)

OTHER PUBLICATIONS

"Trimble® TX5 3D Laser Scanner Quick Start Guide," Trimble, 2012, pp. 1-8.
(Continued)

*Primary Examiner* — Dominic J Bologna
(74) *Attorney, Agent, or Firm* — Oliff PLC

(57) ABSTRACT

A laser scanner having a rotor that is rotatably held on a housing which in turn is rotatable about an axis of rotation, wherein a lens system is arranged in the rotor in order to direct a measuring beam emitted by a transmitter onto a measurement object or to direct a beam reflected by the measurement object onto a detector, wherein a camera for acquiring image information of the measurement object is arranged in the rotor. Also, a lighting unit, by which an image field of the camera can be illuminated depending on a camera position.

15 Claims, 2 Drawing Sheets

(51) Int. Cl.
| | |
|---|---|
| *G01S 17/89* | (2020.01) |
| *G03B 15/03* | (2006.01) |
| *G03B 17/48* | (2006.01) |
| *G03B 37/02* | (2006.01) |
| *H04N 5/225* | (2006.01) |
| *G01S 7/481* | (2006.01) |

(52) U.S. Cl.
CPC .............. *G01S 17/89* (2013.01); *G03B 15/03* (2013.01); *G03B 17/48* (2013.01); *G03B 37/02* (2013.01); *H04N 5/2256* (2013.01)

(56) References Cited

U.S. PATENT DOCUMENTS

| | | | | |
|---|---|---|---|---|
| 2010/0208318 | A1* | 8/2010 | Jensen | G01S 7/4818 359/200.7 |
| 2010/0214168 | A1* | 8/2010 | Stucki | H01Q 21/0056 342/357.77 |
| 2010/0245849 | A1* | 9/2010 | Satzky | G01S 7/4972 356/622 |
| 2014/0111618 | A1 | 4/2014 | Kumagai et al. | |
| 2014/0300906 | A1 | 10/2014 | Becker et al. | |
| 2015/0085110 | A1* | 3/2015 | Pettersson | G01S 17/89 348/140 |
| 2015/0098075 | A1* | 4/2015 | Bestler | G01C 15/002 356/3.01 |
| 2017/0184394 | A1* | 6/2017 | Ditte | G01B 11/002 |

FOREIGN PATENT DOCUMENTS

| | | |
|---|---|---|
| DE | 10 2012 105 027 A1 | 1/2013 |
| DE | 20 2013 001 538 U1 | 3/2013 |
| DE | 10 2014 110 809 A1 | 9/2015 |
| DE | 10 2014 109 432 A1 | 10/2015 |
| DE | 10 2016 102 607 A1 | 8/2016 |
| EP | 2 860 550 A1 | 4/2015 |

OTHER PUBLICATIONS

"Trimble TX5 3D Laser Scanner User Guide," Trimble, Oct. 2012, 125 pages.

Feb. 6, 2018 International Search Report issued in International Patent Application No. PCT/EP2017/072347.

Mar. 19, 2019 International Preliminary Report on Patentability issued in International Patent Application No. PCT/EP2017/072347.

Nov. 29, 2017 International Search Report issued in International Patent Application No. PCT/EP2017/072365.

Mar. 19, 2019 International Preliminary Report on Patentability issued in International Patent Application No. PCT/EP2017/072365.

U.S. Appl. No. 16/332,737, filed Mar. 12, 2019 in the name of Fröhlich et al.

* cited by examiner

Fig. 1
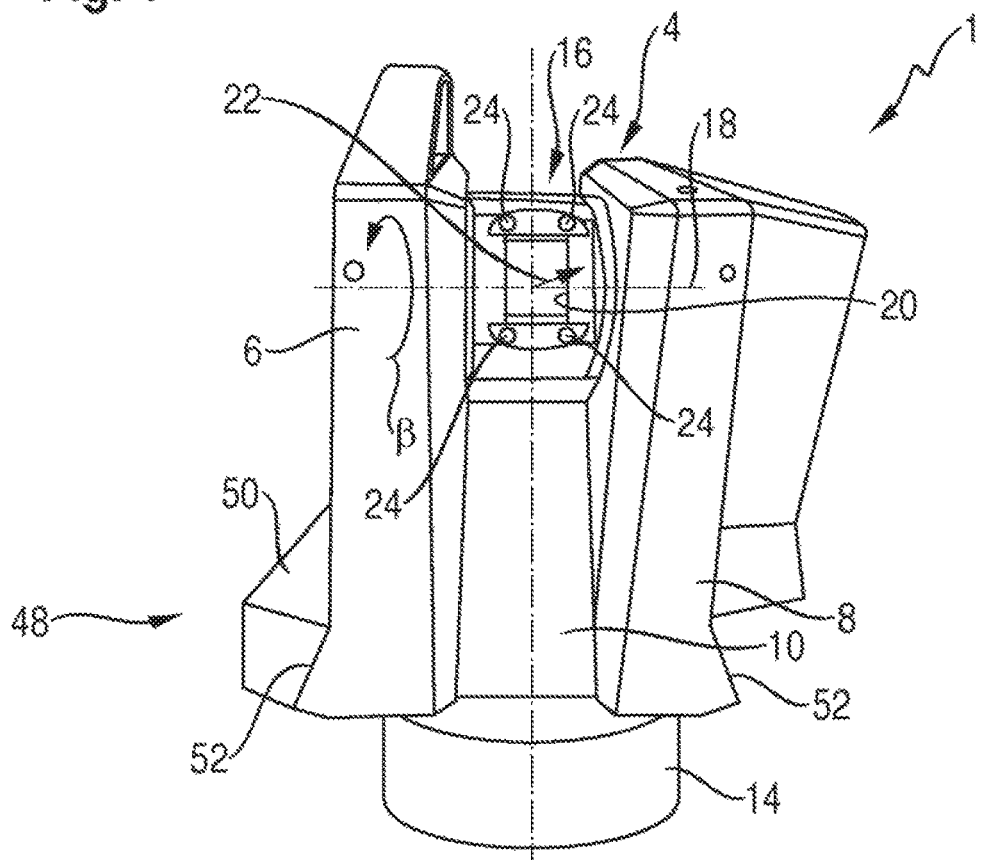
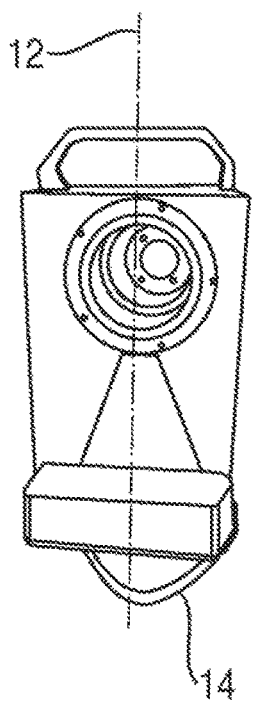
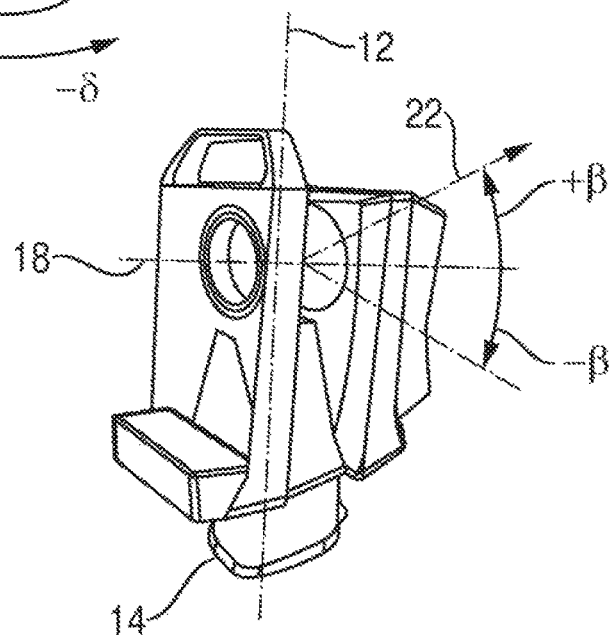
Fig. 2            Fig. 3

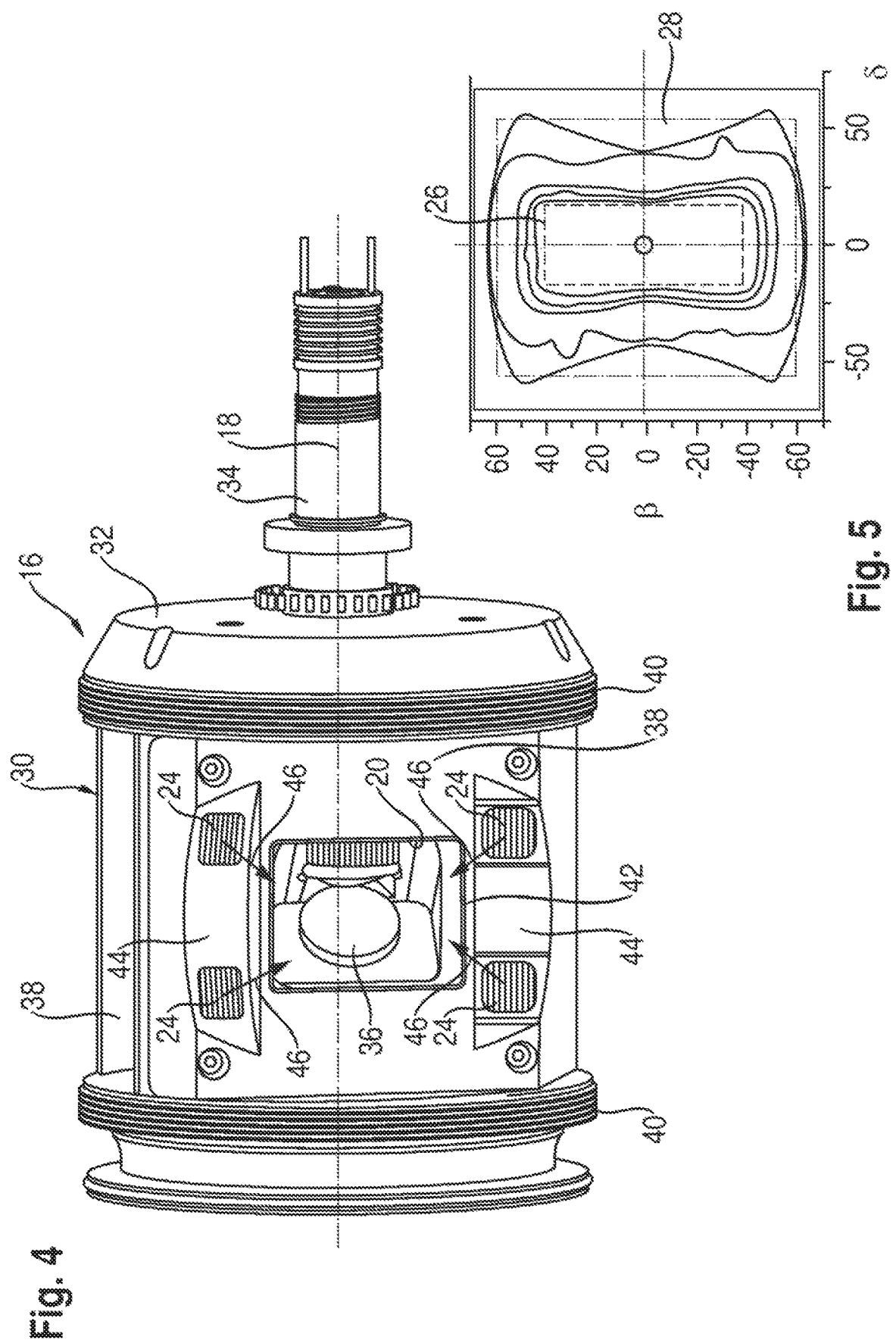

LASER SCANNER WITH LIGHT

BACKGROUND

The invention relates to a laser scanner according to the preamble of patent claim 1.

A laser scanner is known from DE 10 2012 105 027 A1, in which a camera is arranged on a revolving rotating head—hereinafter referred to as rotor—which can be used to record the color information of a measuring object to be measured. This color camera rotates together with an optics via which a measuring beam emitted by an emitter can be directed at a measuring object.

With the color camera, the color information required for the measurement can be captured without significant color falsification and can be assigned to the measuring data detected with the laser scanner so that 3D color imaging is possible.

Such 3D scanners are also used for measuring dark rooms, such as shafts. However, the detection of the color information via the color camera is difficult due to the lack of illumination of such environments. In principle, illumination could be provided by external lights, which are on the one hand difficult to install and on the other hand do not guarantee sufficient illumination.

The disclosure document DE 10 2014 110 809 A1 of the Applicant shows a solution in which the illumination of the room is provided by an additional light arranged on the laser scanner housing and is thus carried along by the movement of the laser scanner. A light head with several rows of LEDs arranged in an approximately spherical manner is fixed on the housing of the laser scanner. Each rotation of the laser scanner is thus also carried out by the fixed light. This ensures reliable illumination of the image field of the camera.

Although the illumination is reliable, it is not always optimal in terms of homogeneity of the light intensity, since a luminous field that can be illuminated may be shifted against the image field of the camera.

SUMMARY

In view of this, the object of the invention is to provide a laser scanner with a homogeneously illuminated image field.

This object is solved by a laser scanner with the features of patent claim 1.

Advantageous further developments of the invention are the subject matter of dependent claims 2 to 15.

A laser scanner has a rotor which is mounted on a housing of the laser scanner around a pivot axis—hereinafter referred to as axis of rotation. The housing in turn can be rotated around a pivot axis, for example relative to a supporting or standing device of the laser scanner. This can be, for example, a mounting flange. An optics is arranged in the rotor, via which a measuring beam that can be emitted by an emitter can be directed onto a measuring object, or a beam that can be reflected or is reflected by the measuring object can be directed onto a receiver—hereinafter referred to as a detector. Emitter and detector are preferably components of the laser scanner. Furthermore, a camera for detecting image information of the measuring object is arranged in the rotor of the laser scanner. In order to detect the image information with sufficient quality, the laser scanner also has a light unit which can be used to illuminate the image field depending on the position of the camera. According to the invention, at least one light outlet, in particular a light source of the light unit, is arranged on the rotor.

Since the light outlet is arranged on the rotor itself, it is spatially close to the light inlet of the camera, which can reduce a possible parallax error between an illumination direction and an optical axis of the camera. In addition, it is ensured that the illumination direction always accompanies the rotation of the rotor and thus the optical axis of the camera in a technically simple way.

In a further development, the laser scanner has more than one measuring frequency, in particular two or three measuring frequencies.

Preferably, the light unit has one or more LEDs as an illuminant. One or more LEDs can be assigned to each light outlet. As a result, the light unit still has a high light intensity while requiring little installation space.

The illuminant can be located in the area of the light outlet or in an area remote from it. In the second case, the light of the illuminant can be directed towards the light outlet, for example via a fiber optic light guide through the rotor.

In a preferred further development, the light unit has several light outlets arranged on the rotor. In this way, for example, a larger image field can be illuminated with a small, in particular eliminated, parallax error. Alternatively or in addition, the use of several light outlets can serve to make the illumination of the image field more homogeneous and/or more focused.

In a preferred further development, the light outlets are arranged in such a way that a main illumination direction, i.e. a resulting illumination direction of the multiple light outlets, coincides with an optical axis of the camera or approximately coincides with it. This ensures that the image field is always optimally illuminated at every distance between the camera and the measuring object. Alternatively, the main illumination direction can be parallel or approximately parallel to the optical axis of the camera.

The main illumination device results from the illumination directions of the light outlets. In a further development, the illumination directions of the light outlets are convergent to the optical axis of the camera. In particular, the distance of a focal point of the illumination directions from the rotor is fixed or adjustable.

In order to change this distance, for example, in a further development at least one of the illumination directions can be adjusted, in particular pivoted, against the optical axis of the camera. This can be done, for example, via a servo motor or another type of actuator.

Preferably, the light outlets are distributed around the optical axis of the camera. Preferably, they are equally distributed. The distribution around the optical axis makes it possible to ensure the aforementioned homogeneous illumination of the image field and/or focusing in a simple way.

It is advantageous if the light outlets towards the optical axis of the camera each have the same radial distance. The illumination is even more homogeneous if the light outlets are arranged around the optical axis of the camera at the same angular distance.

In a further development, the homogeneity of the illumination is improved by arranging the respective light outlets at the same distance from the axis of rotation of the rotor.

Conversely, the image field can, if desired, be illuminated inhomogeneously if the light outlets have different distances to the axis of rotation.

The light outlets are combined into groups in a further development.

In a preferred further development, one of the groups is arranged on this side and another of the groups on the other side of a plane spanned by the optical axis of the camera and the axis of rotation of the rotor. Under the assumption of a horizontal axis of rotation of the rotor, one group is thus arranged above and the other below the plane. The groups can be formed symmetrically to the plane. This means that they can have an equal number of light outlets in an arrangement symmetrical to the plane.

A particularly homogeneous illumination is also possible if in a further development the groups extend concentrically around the optical axis of the camera and are radially spaced apart from each other. In other words, the light outlets are then distributed around the optical axis on concentric pitch circles of different radii.

As an alternative to this circular arrangement, the groups can also have a linear arrangement of the light outlets.

In a further development, the laser scanner has a rechargeable battery arrangement with at least two rechargeable batteries, which are referred to below as accumulators. These are equally distributed on both sides of the pivot axis of the housing. In particular, they are distributed with regard to their mass moment of inertia relative to the pivot axis of the housing, so that the rotation of the housing can take place with minimum unbalance.

Two, three, four or more accumulators can be provided.

A more detailed description of these accumulators and their arrangement is given in the parallel application of the Applicant with the file number DE 10 2016 119 155.

In a preferred further development, the laser scanner has a memory unit that can be easily exchanged in a modular manner, hereinafter referred to as data memory, in particular a solid state drive or a solid-state drive (SSD). At least the measurement information and/or the image information of the measuring object can be stored, is in particular stored, on the data memory. The simple, modular change of the data memory enables, among other things, the backup of data by simply removing the data memory from the laser scanner. This is advantageous, for example, for measurement tasks involving buildings with high security or confidentiality requirements. These include, for example, measurements within nuclear power plants or military facilities.

In a further development of the laser scanner, an operating software enabling the operation of the laser scanner is stored on the data memory, in particular an operating system. This makes the operation of the laser scanner impossible when the data memory is removed. This also supports the aforementioned security requirements, since the laser scanner is protected against unauthorized use.

A more detailed description of the aspects of the data memory is given in the aforementioned DE 10 2016 119 155.

In a further development of the laser scanner, illuminants of the individual light outlets can be individually controlled for optimum illumination with regard to their illumination direction and/or light intensity and/or color.

A rotary encoder or encoder, by means of which the rotational position of the housing and/or of the rotor can be detected and consequently in particular controlled, is arranged in a further development instead of on a rotary motor, hereinafter referred to as the motor of a rotary drive, rather on an axis driven by it.

In a further development, it proves to be advantageous if a gear between the motor and the axis is designed play-free, especially as a play-free gear train.

BRIEF DESCRIPTION OF THE DRAWINGS

A concrete example of a laser scanner according to the invention is now explained in more detail with the help of some figures.

These show:

FIG. 1 shows a laser scanner in a view from the front,

FIG. 2 shows the laser scanner according to FIG. 1 with opened housing, in a side view, FIG. 3 shows the laser scanner according to FIG. 2 in an isometric view, FIG. 4 shows a rotor with integrated optics and light outlet in a light unit of the laser scanner according to the figures, and FIG. 5 shows an illumination field of the light unit as a function of a horizontal rotation angle (azimuth angle) and a vertical rotation angle (polar angle).

DETAILED DESCRIPTION OF EMBODIMENTS

According to FIG. 1, a laser scanner 1 has a housing 4, which has two housing parts 6 and 8 of approximately the same shape, which are substantially elongated and cuboid. Both housing parts 6 and 8 are connected by a third, lowered housing part 10—hereinafter referred to as housing intermediate part 10. The housing 4 with its housing parts 6, 10, 8 extends on both sides and substantially symmetrically to a vertical plane of the laser scanner 1. A pivot axis 12 is arranged in this, around which the housing 4 can be rotated. Furthermore, the laser scanner 1 has a motor, in particular an electric motor (not shown), which is accommodated in the housing 4 or in a foot 14—hereinafter referred to as mounting flange 14—of the laser scanner 1.

According to FIG. 1, the housing intermediate part 10 has a smaller vertical height in relation to the pivot axis 12 than the two housing parts 6 and 8, so that a yoke is lowered between the housing parts 6 and 8. In this yoke, a rotor 16 is mounted rotatably around an axis of rotation 18. At rotor 16, an inlet or respectively outlet window 20 of a camera (not shown) arranged within rotor 16 is formed. In the following, the inlet or respectively outlet window is referred to as camera window 20. The camera window 20 has an approximately rectangular basic shape.

Basically, the following rotational movements of the laser scanner 1 and of the rotor 16 are possible. According to FIG. 1, the housing 4 of the laser scanner 1 can be rotated 360° in both directions around the mounting flange 14 around the vertical or pivot axis 12 with an azimuth angle δ. The rotor 16 can in turn be rotated relative to the housing around the axis of rotation 18 with the vertical or polar angle β<360°. The optical axis 22 of the camera aligns itself depending on the two aforementioned rotation angles δ, β. In other words: the optical axis 22 of the camera is aligned as a function of the two aforementioned rotation angles δ, β. The camera "looks" in the direction of the optical axis 22.

According to FIG. 1, the camera window 20 is flanked at its four corners by a light outlet 24 of each light unit of the laser scanner 1. In the area inside the rotor 16, behind the light outlets 24, a respective LED or LED arrangement is arranged. The light outlets 24 are distributed in a plane to which a normal is formed from the optical axis 22. The light outlets 24 are each positioned at the same radial distance from the optical axis 22. This arrangement of the light outlets 24 ensures that a main illumination direction of the light unit—i.e. a resultant of illumination directions of the light outlets 24—coincides with the optical axis 22. This ensures precise and homogeneous illumination of an image field of the camera for almost any distance from the rotor 16.

A luminous field 28 of the light unit and an image field 26 of the camera framed in it are shown in the diagram according to FIG. 5. The azimuth angle δ, which is measured around the pivot axis 12 of housing 4, and the polar angle β, which is measured around the axis of rotation 18 of rotor 16, are shown here. A light intensity in the luminous field 28 is assigned to a grey or hatch value. The light intensity is formed homogeneously within the image field 26 and decreases from the boundaries of the image field 26 towards the outside.

The illustration according to the diagram shows fields 26, 28 as they result in a resting neutral position of housings 4 and rotor 16. The housing 4 and the rotor 16 are in the neutral position at an azimuth angle δ and a polar angle β of 0°, respectively.

Regardless of the position of housing 4 and rotor 16, the luminous field 28 extends around the optical axis 22 in an angular interval of the azimuth angle δ of about 100° and the polar angle β of about 120°, solely due to the selected arrangement of the four light outlets 24. The associated image field 26 extends around the optical axis 22 in an angle interval of the azimuth angle δ of about 40° and the polar angle β of about 80°.

In relation to the neutral position, the luminous field 28 crosses the azimuth angle from δ=−50°, over δ=0 to δ=+50° and the polar angle from β=−60°, over β=0 to β=+60°. The image field 26 crosses the azimuth angle from δ=−20°, over δ=0 to δ=+20° and the polar angle from β=−40°, over β=0 to β=+40°.

The achievable luminous field 28 in the embodiment shown is larger than the achievable image field 26. This is due to the fact that a luminous intensity and its homogeneity in the image field 26 must meet minimum requirements. By definition, these are only fulfilled within the limits of the image field 26.

FIG. 5 clearly shows that the image field 26 is almost rectangular, with the luminous intensity being homogeneously formed within the image field 26. By using the LEDs as illuminant of the light unit, a particularly precise, defined shape of the image field 26 is achieved. This precision has a positive effect on the quality result of the image information collected by the camera.

Outside the image field 26, the light intensity or illumination intensity drops towards the limits of the luminous field 28.

By rotating the laser scanner 1 around the pivot axis 12 and the rotor 16 around its axis of rotation 18, a three-dimensional space can now be scanned as desired and the associated image information can be collected in high quality and correctly illuminated.

In the polar direction, the comparatively large polar angle interval of the luminous field 28 of about 120° is made possible by the fact that, according to FIG. 1, the housing intermediate part 10 of the laser scanner 1 rises in a ramp-like manner from the mounting flange 14 to the rotor 16. Due to the resulting gap between the housing parts 6 and 8, the light of the light outlets 24 can exit downwards according to a polar angle of about −60°.

A detailed view of rotor 16, isolated from the rest of the laser scanner 1, is shown in FIG. 4. The rotor 16 extends around the pivot axis 18 with a partially rotationally symmetrical basic shape. It has a housing 30, wherein at a front side 32 of the housing 30 a driving shaft 34 protrudes concentrically towards the axis of rotation 18. Via the driving shaft 34, the rotor 16 can be set in rotation around the axis of rotation 18. In addition, the driving shaft 34 has contacts and connections at its end portion for the power and data supply of the camera and LEDs of the light unit arranged in the rotor 16.

The camera window 20 of the camera arranged in rotor 16 (not shown) is formed on rotor 16. The rotor 16 also contains an optics 36, in particular a camera mirror 36, via which a measuring beam of the laser scanner 1 can be deflected to a measuring object. In the embodiment shown, a beam reflected by the measuring object can be deflected back through the camera window 20 to a detector (not shown) of the laser scanner 1 via the same camera mirror 36.

In the embodiment shown, both the measuring beam and the reflected laser beam as well as the image information are guided through the same window—the camera window. Alternatively, the measuring beam and the reflected beam can be guided independently of the image information. For example, in an alternative configuration, the laser beams (measured and reflected beam) can be guided via a separate window, in particular a protection glass, instead of via the camera window, whereas the image information still enters the rotor via the camera window. The protection glass and the camera window can be arranged diametrically or almost diametrically on the rotor.

The camera window 20 is formed in one of four flattenings 38 of the housing 30, which are distributed circumferentially and which are located between two cylindrical end portions 40 of the rotor 16 and which together form a cuboid section of the housing 30. The flattening 38 with the camera window 20 has a milled-out portion 44 on a respective broad side 42 of the camera window 20, which is concave with regard to the flattening 38. The respective milled-out portion 44 extends beyond the broad side 42 on both sides. A respective light outlet 24 of the light unit formed by a transparent pane is arranged in the end areas of the milled-out portion 44, approximately at the corners of the camera window 20. One of the already mentioned LEDs is arranged behind the light outlet 24, inside the rotor 16.

Due to the concave shape of the milled-out portion 44 and the alignment of the light outlets 24 adapted thereto, illumination directions 46 of the light outlets 24 point towards the optical axis 22 of the camera as shown in FIG. 3. This circumstance is shown in FIG. 4 somewhat exaggerated by single arrows, which extend away from the light outlets 24 and converge to the optical axis 22, which represents the plane normal of the camera window 20.

In the embodiment shown, continuous dimming of the respective illuminant of the light outlet 24, in particular of a respective LED or LED arrangement, is possible.

In this way, the power consumption between individual images taken by the camera can be reduced. Furthermore, the light unit can also be used for tasks that require a different light intensity than that required by the photographic illumination.

Alternatively or additionally, the dimming can have a step dimming.

The light unit, especially its illuminant or LED's, is controlled via an internal control device (not shown) of the laser scanner 1.

Power is supplied to the light unit, the camera, the emitter and detector, as well as the control unit of the laser scanner 1 as shown in FIG. 1 via a rechargeable battery arrangement 48, of which only one accumulator of a double accumulator with two accumulators 50 can be seen in FIG. 1.

The accumulator 50 shown here is attached to an outer flank section 52 of the housing part 6 close to the base. In the following, the outer flank section 52 is referred to as accommodation 52. In order to hold the accumulator 50, the accommodation 52 is extended laterally outwards, so that fastening the accumulator 50 is simplified and safer. In this way, the accumulator 50 is supported more effectively on the housing part 6. Two accumulators 50 are provided in the embodiment shown (only one shown). Accordingly, the housing part 8 also has an accommodation 52.

Disclosed is a laser scanner with a rotor, which is rotatably mounted on a housing of the laser scanner, which in turn is rotatable around a pivot axis. An optics is arranged in the rotor to direct a measuring beam emitted by an emitter onto a measuring object or a beam reflected by it onto a detector. In addition, a camera for detecting image information of the measuring object is arranged in the rotor. According to the invention, the laser scanner has a light which is arranged on the rotor, so that depending on a position of the camera, an image field whose image information is to be detected by the camera is illuminated without parallax error or almost without parallax error.

LIST OF REFERENCE SIGNS

1 laser scanner
4 housing
6, 8 housing part
10 housing intermediate part
12 pivot axis of housing
14 mounting flange
16 rotor
18 axis of rotation of rotor
20 camera window
22 optical axis of camera
24 light outlet
26 image field
28 luminous field
30 housing
32 front side
34 driving shaft
36 camera mirror
38 flattening
40 end portion
42 broad side
44 milled-out portion
46 illumination direction
48 rechargeable battery arrangement
50 accumulator
52 accommodation
δ azimuth angle
β polar angle

The invention claimed is:

1. A laser scanner comprising:
   a rotor that is rotatably mounted on a housing, the housing being rotatable about a pivot axis;
   optics arranged in the rotor, the optics being configured to direct a measuring beam emitted by an emitter onto a measuring object or direct a beam reflected by the measuring object onto a detector;
   a camera disposed on the rotor, the camera being configured to detect image information of the measuring object; and
   a light unit including at least one light outlet arranged on the rotor, the light unit being configured to illuminate an image field depending on a position of the camera.

2. The laser scanner according to claim 1, wherein the at least one light outlet includes a plurality of light outlets are arranged on the rotor.

3. The laser scanner according to claim 1, wherein a main illumination direction of the at least one outlet coincides with an optical axis of the camera and/or is parallel to the optical axis of the camera.

4. The laser scanner according to claim 1, wherein the at least one outlet includes plural light outlets and illumination directions of each of the plural light outlets are convergent to an optical axis of the camera.

5. The laser scanner according to claim 1, wherein at least one illumination direction of the at least one light outlet is adjustable against an optical axis of the camera.

6. The laser scanner according to claim 1, wherein the at least one outlet includes plural light outlets and illumination directions of each of the plural light outlets is focused on the image field.

7. The laser scanner according to claim 1, wherein the at least one outlet includes plural light outlets and the plural light outlets are distributed around an optical axis of the camera.

8. The laser scanner according to claim 1, wherein the at least one outlet includes plural light outlets, each of the plural light outlets having at least one of: (i) the same radial distance towards an optical axis of the camera, and (ii) the same angular distance around an optical axis of the camera.

9. The laser scanner according to claim 1, wherein the at least one outlet each have the same distance to the axis of rotation of the rotor.

10. The laser scanner according to claim 1, wherein the at least one outlet includes plural light outlets that are arranged in groups.

11. The laser scanner according to claim 10, wherein one of the groups is arranged on a first side of a plane spanned by an optical axis of the camera and the axis of rotation of the rotor, and another one of the groups is arranged on a second side of the plane spanned by the optical axis of the camera and the axis of rotation of the rotor, the second side being opposite to the first side.

12. The laser scanner according to claim 11, wherein the groups are symmetrical to the plane.

13. The laser scanner according to claim 10, wherein the groups extend at least in sections concentrically around an optical axis of the camera and are radially spaced from each other.

14. The laser scanner according to claim 10, wherein the groups extend in rows at least in sections.

15. The laser scanner according to claim 1, further comprising:
   a rechargeable battery arrangement including at least two accumulators, the at least two accumulators being distributed around the pivot axis of the housing.

* * * * *